United States Patent [19]

Steele

[11] Patent Number: 5,137,359
[45] Date of Patent: Aug. 11, 1992

[54] DIGITAL PHASE MODULATOR FOR FIBER OPTIC SAGNAC INTERFEROMETER

[75] Inventor: James R. Steele, Northridge, Calif.

[73] Assignee: Litton Systems, Inc., Woodland Hills, Calif.

[21] Appl. No.: 670,956

[22] Filed: Mar. 18, 1991

[51] Int. Cl.[5] .............................................. G01C 19/72
[52] U.S. Cl. ....................................... 356/350; 385/14
[58] Field of Search ............................ 356/345, 350; 250/227.19, 227.27; 385/14; 332/144, 146

[56] References Cited

U.S. PATENT DOCUMENTS

| | | | |
|---|---|---|---|
| 4,705,399 | 11/1987 | Graindorge et al. | 356/350 |
| 4,789,241 | 12/1988 | Michal et al. | 356/350 |
| 5,018,859 | 5/1991 | Chang et al. | 356/350 |

Primary Examiner—Samuel A. Turner
Attorney, Agent, or Firm—Elliott N. Kramsky

[57] ABSTRACT

A phase modulator for use in a circuit for measuring the output of a fiber optic gyroscope. The phase modulator is adapted to receive the digital word generated by such a circuit that comprises phase shift information. The digital word includes both the feedback Serrodyne ramp and the phase modulation conventionally generated for shifting the operating point of the gyroscope to enhance the sensitivity of output beam intensity to phase difference. The modulator employs a plurality of electrode elements with the lengths of adjacent segments having a power-of-two relationship. As a result, the digital word may be directly received by the phase modulator without prior conversion to an analog signal.

7 Claims, 5 Drawing Sheets

DIGITAL PHASE MODULATOR FOR FIBER OPTIC SAGNAC INTERFEROMETER

BACKGROUND

1. Field of the Invention

The present invention relates to apparatus for measuring rotation. More particularly, this invention pertains to a phase modulator for use in a fiber optic Sagnac interferometer of the type that employs a closed-loop control system that relies upon a digital Serrodyne phase ramp.

2. Description of the Prior Art

The Sagnac interferometer is an instrument for determining rotation by measurement of the nonreciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "nonreciprocal" perturbations affect the counterpropagating beams differently and according to the direction of propagation. Such nonreciprocal perturbations are occasioned by physical effects that disrupt the symmetry of the optical medium in which the two waves propagate.

Two of the nonreciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of a ring gyroscope.

The measured or detected output of a gyroscope is a "combined" beam (i.e., a composite beam formed of the two counterpropagating beams after one complete traverse of the gyroscope loop.) The rotation rate about the sensitive axis is proportional to the phase shift that occurs between the counterpropagating beams. Accordingly, accurate phase shift measurement is essential.

FIG. 1 is a graph that illustrates the relationship between the intensity of the combined (output) beam and the phase difference between the counterpropagating composite beams. The fringe pattern as shown consists of two elements, a d.c. component and a component that is proportional to the cosine of the phase difference between the beams. Such phase difference provides a measure of the nonreciprocal perturbation due, for example, to rotation.

As a consequence of the shape of the fringe pattern, when small phase differences are to be measured (e.g. low rotation rates), the intensity of the combined beam is relatively insensitive to phase difference as the phase difference is then close to a maximum of the fringe pattern. Further, mere intensity of the composite beam does not indicate the sense or direction of rotation.

For the foregoing reasons, an artificially biased phase difference is commonly superimposed upon the counterpropagating beams. The biasing of the phase shift, also known as a "nonreciprocal null-shift", enhances the sensitivity of the intensity measurement to phase difference. A maximum degree of sensitivity is achieved by shifting the operating point of the gyroscope to $\pm \pi/2$. Furthermore, by alternating the bias between $+\pi/2$ and $-\pi/2$, two different operating points are observed. This enables the system to determine the sign of the phase difference and, thus, the direction of rotation.

In addition to phase modulation, the processing of the interferometer output commonly employs "phase-nulling" which introduces an additional phase shift through a negative feedback mechanism to compensate for that due to the non-reciprocal (Sagnac) effect. Commonly, the negative feedback generates a phase ramp whose slope is proportional to the rate of change of the measured phase difference. In actual practice, a ramp whose height varies between zero and $2\pi$ radians is employed as the nulling phase shift cannot be increased indefinitely due to voltage constraints.

In the past, phase nulling has employed both analog and digital techniques. In analog phase nulling, a sawtooth waveform whose slope is proportional to the rate of change of the phase difference and whose peak-to-peak amplitude is equal to $2\pi$ radians is combined with the above-described phase modulation (null shift) signal to drive the electro-optic phase modulator located within the gyroscope coil. The analog method is limited insofar as the scale factor of the phase modulation command differs from that utilized for the negative feedback. Furthermore, it is quite difficult to detect the $2\pi$ radians peak-to-peak amplitude in the analog method described supra.

U.S. Pat. No. 4,705,399 of Graindorge, Ardity and Lefevre discloses a digitally-based arrangement that overcomes a number of the shortcomings of the analog sawtooth technique. In the patented system, a "stair-step" waveform replaces the sawtooth. The height of each step is equal to the measured phase difference while the width or duration of each is the group delay time of the optical coil. FIG. 2 is a graph of a portion of such a feedback ramp signal. On the average, the slope of the ramp is equivalent to the measured nonreciprocal phase difference per unit of time. Two waves whose respective delay is equal to the group delay of the gyro loop are always on two consecutive steps and their phases differ by $\Delta\phi_0$. This method is compatible with digital signal processing and enjoys many resulting advantages. Additionally, the phase modulation may be directly added to the digital ramp through the synchronization offered by a digital signal processor.

The (combined) signal ultimately controls the phase modulator that is positioned near one end of the optical fiber coil. This device may comprise an electrooptic crystal whose index of refraction is responsive to an applied voltage or a piezoelectric structure arranged to exert pressure upon the optical fiber in response to an applied voltage. The pressure, in turn, affects the refractive index of the somewhat-compressed optical fiber. In either case, the digital word that consists of the feedback (ramp)-plus-phase modulation information is converted to an analog signal prior to application to the phase modulator electrodes. This conversion requires both a digital-to-analog converter and a high speed operational amplifier, each of which is a relatively-expensive component.

SUMMARY OF THE INVENTION

The present invention addresses and overcomes the foregoing and additional shortcomings of the prior art by providing an improvement in a circuit for measuring the output of a fiber optic gyroscope of the type that includes a photodetector for receiving the optical output of the gyroscope and converting such output to a corresponding electrical signal. Means are provided in the circuit for generating a digital Serrodyne phase ramp and for generating a digital modulation signal. Means are further provided for combining the digital signals to form a digital command. A phase modulator is responsive to the phase ramp and the phase modulation signal. The improvement that is affected by the invention lies in the phase modulator being actuated by the digital word.

The foregoing features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the figures and the written description.

DETAILED DESCRIPTION

Figure 3:
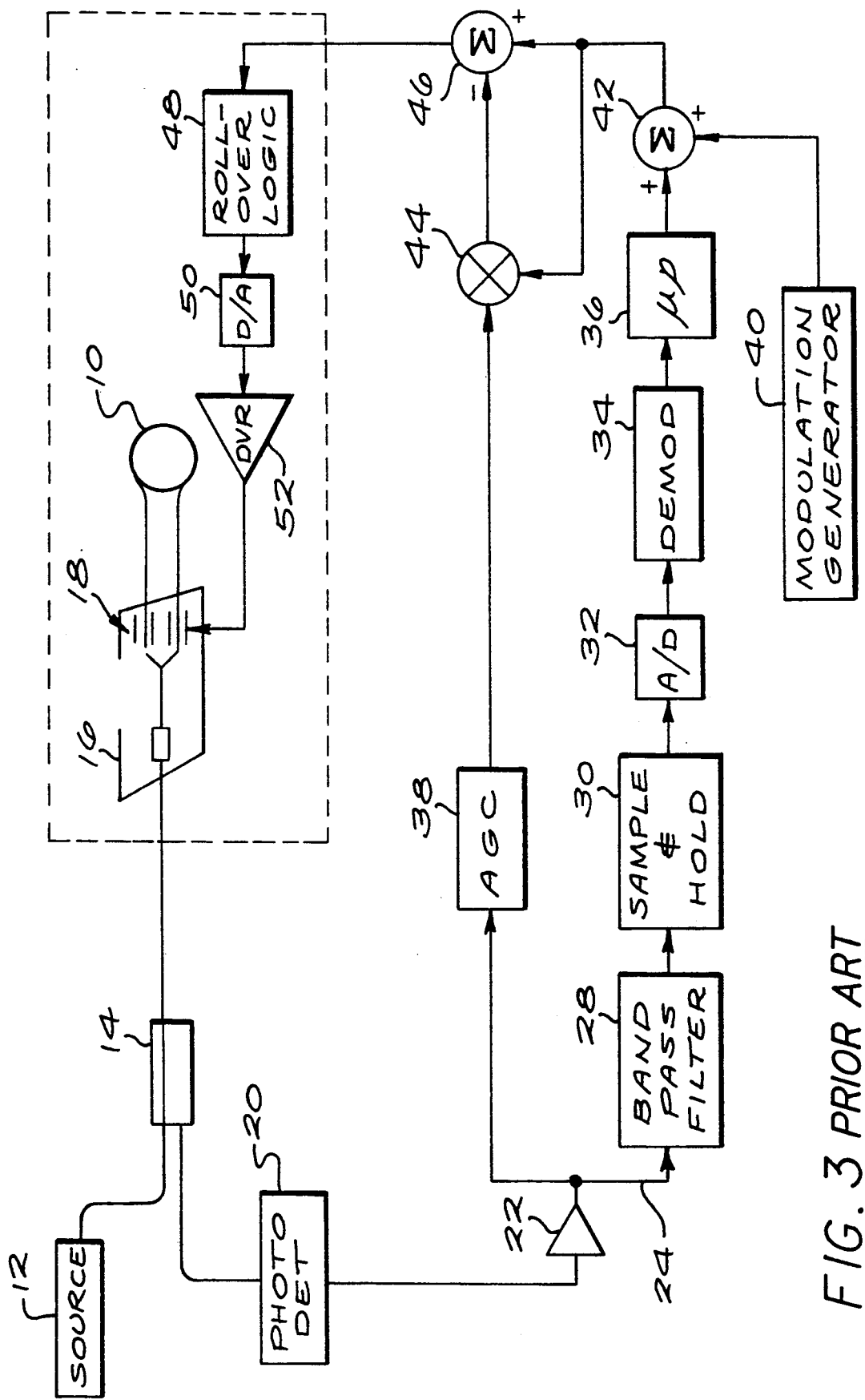
FIG. 3 is a schematic diagram of a closed-loop fiber optic gyro in accordance with the prior art.

FIG. 3 is a schematic diagram of a closed-loop fiber optic gyro in accordance with the prior art. The overall system illustrated is of the "digital" type with functions controlled and synchronized by means of a microprocessor (not shown). The detailed arrangement of such a system and the necessary interconnections and timing relationships between the controlling microprocessor and the various functional units of the system will be apparent to those skilled in the art. Further clarification concerning such relationships may be had by reference to U.S. Pat. No. 4,705,399 which has been discussed previously.

Figure 1:
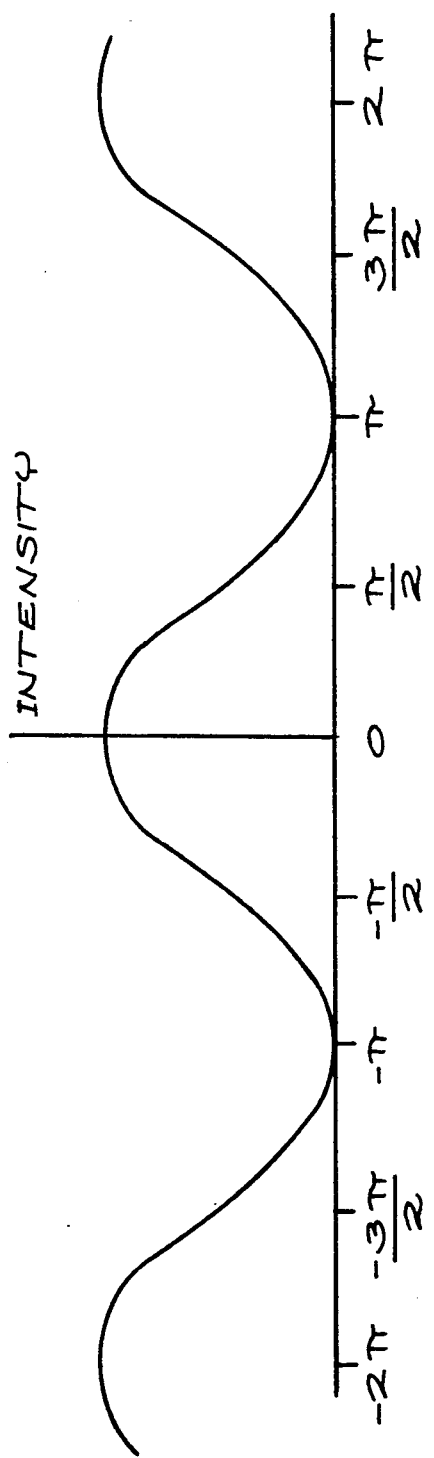
FIG. 1 is a graph of the relationship between the intensity of the output (combined) beam and the phase difference between the counterpropagating (component) beams in a Sagnac interferometer.
Figure 2:
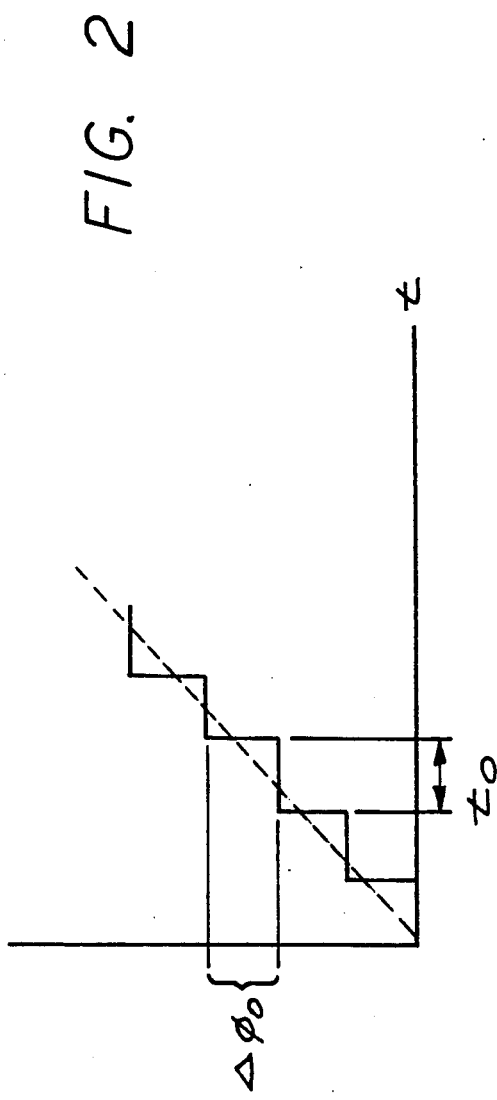
FIG. 2 is a graph of a Serrodyne phase ramp.

The digital system of FIG. 3 incorporates both negative feedback by means of a Serrodyne phase ramp bias of the type disclosed and discussed with reference to FIG. 2 and a phase modulation bias that alternates, for example, between $\pm \pi/2$ radians. As discussed above, a digital system such as that illustrated generates a digital word or command for application during each period $\tau$ corresponding to the transit time of the gyro coil 10. In a representative system, every $256\tau$ an additional $2\pi$ voltage step is added to or subtracted from the $\pm\pi/2$ voltage waveform (phase bias) to generate error signals that are proportional to the error in applied $2\pi$ voltage.

The gyroscope loop or coil 10 comprises a preselected length of monomode optical fiber. The length of the fiber determines the accuracy of the instrument and, of course, the transit time $\tau$. For example, for a 50 meter gyro, the group delay time is approximately 250 nanoseconds while the transit time is correspondingly reduced to 125 nanoseconds for a 25 meter gyroscope.

A source 12, such as a laser, provides optical energy for driving the gyroscope 10. The output of the source 12 is transmitted through an optical fiber to a bi-directional coupler 14. After passing through the coupler 14, the optical signal is applied to a conventional phase modulator 16 which receives an electrical (voltage) signal at its continuous electrodes 18 for imparting a desired phase difference between the component beams counterpropagating within the gyro coil 10. As can be seen, the phase modulator 16 is located near the end of the coil 10 so that a measurable phase difference will occur in the output (combined) beam. That is, by positioning the phase modulator 16 near the end of the coil 10, one is assured that a phase difference will be imposed upon the counterpropagating beam pair for substantially $\tau$ nanoseconds.

The combined output beam passes through the bi-directional coupler 14 and is transmitted through an optical fiber to a photodetector 20. The optical signal incident at the photodetector 20 comprises an amplitude-modulated square wave with a carrier frequency of $\frac{1}{2}\tau$ (approximately 100 kHz for a 1 kilometer fiber coil 10.) This optical signal has a large d.c. component as well as a rate-dependent a.c. component. The photodetector adds wideband shot noise to the detected signal as it is converted to a corresponding electrical signal.

The output of the photodetector is applied to a gated amplifier 22 and then routed to parallel rate and amplitude servo loops 24 and 26 respectively.

Referring first to the rate loop 24, the signal therein is applied to a bandpass filter 28 that serves to limit noise power aliasing (due to sampling) and to reduce the bandwidth of the modulated signal prior to sampling. The output of the bandpass filter 28 is applied to a sample and hold circuit 30 that samples the modulated signal at a rate of $1/\tau$. The resultant sampled signal is then applied to an analog-to-digital converter 32 and to a demodulator 34 that digitally demodulates the signal.

A microprocessor 36 receives the digitally demodulated signal and produces a corresponding Serrodyne digital phase ramp. The signal processing rate of the micro processor 36 is determined by the non-negligible bandwidth of the remaining baseband signal after demodulation. After integration in the microprocessor 36, the signal is lowpass filtered to further attenuate signal noise at frequencies outside the baseband to produce a "quieter" servo loop. A second rate loop integration ultimately generates the digital Serrodyne phase ramp.

The amplitude loop 26 processes the two gyro outputs that occur when the $2\pi$ voltage step is applied and removed every $256\tau$ nanoseconds. Each of the two signals comprises a modulated rate signal, a $2\pi$ voltage error signal that is not modulated and shot noise generated by the photodetector 20. The rate components of the two signals cancel when they are added, resulting in a signal that is a function of error in applied $2\pi$ voltage. The $2\pi$ voltage error results from changes in the coefficient of the phase modulator 16.

The output of the amplitude loop 26 is employed to scale the rate loop 24 output to the appropriate $2\pi$ voltage. An automatic gain control circuit 38 performs the various functions required for producing the $2\pi$ voltage scaling.

A phase modulation generator 40 produces a stream of digital data for effecting $\pm \pi/2$ radian modulation at a frequency of $1/\tau$. As mentioned earlier, the output of the phase modulation generator 40 is synchronized with that of the rate loop 24 under the control of a common central processing unit. The outputs of the rate loop 24 and the generator 40 are applied to a summer 42 that performs a binary summation to provide a digital word for controlling the modulation applied to the optical coil 10. The digital word is adjusted in terms of scale factor by an arrangement that includes a multiplier 44 and a difference node 46 that combine the output of the summer 42 with that of the amplitude loop 26.

The digital word Serrodyne ramp data combined with the phase modulation is applied to a rollover logic circuit 48 that counts the number of rollovers of the Serrodyne ramp occurring during $\tau$ to derive the digital word that contains the modulation data for the succeeding period $\tau$. In a closed loop fiber optic gyro of the prior art, the resultant digital word is then applied to a digital-to-analog converter 50 that produces an analog signal representative of the phase modulation and the analog signal is applied to a phase modulator driver 52 that conditions the analog signal to produce the desired output of the phase modulator 16. As mentioned earlier, the digital to analog converter 50 and phase modulator driver 52 constitute relatively expensive components of the overall system of FIG. 3.

Figure 4:
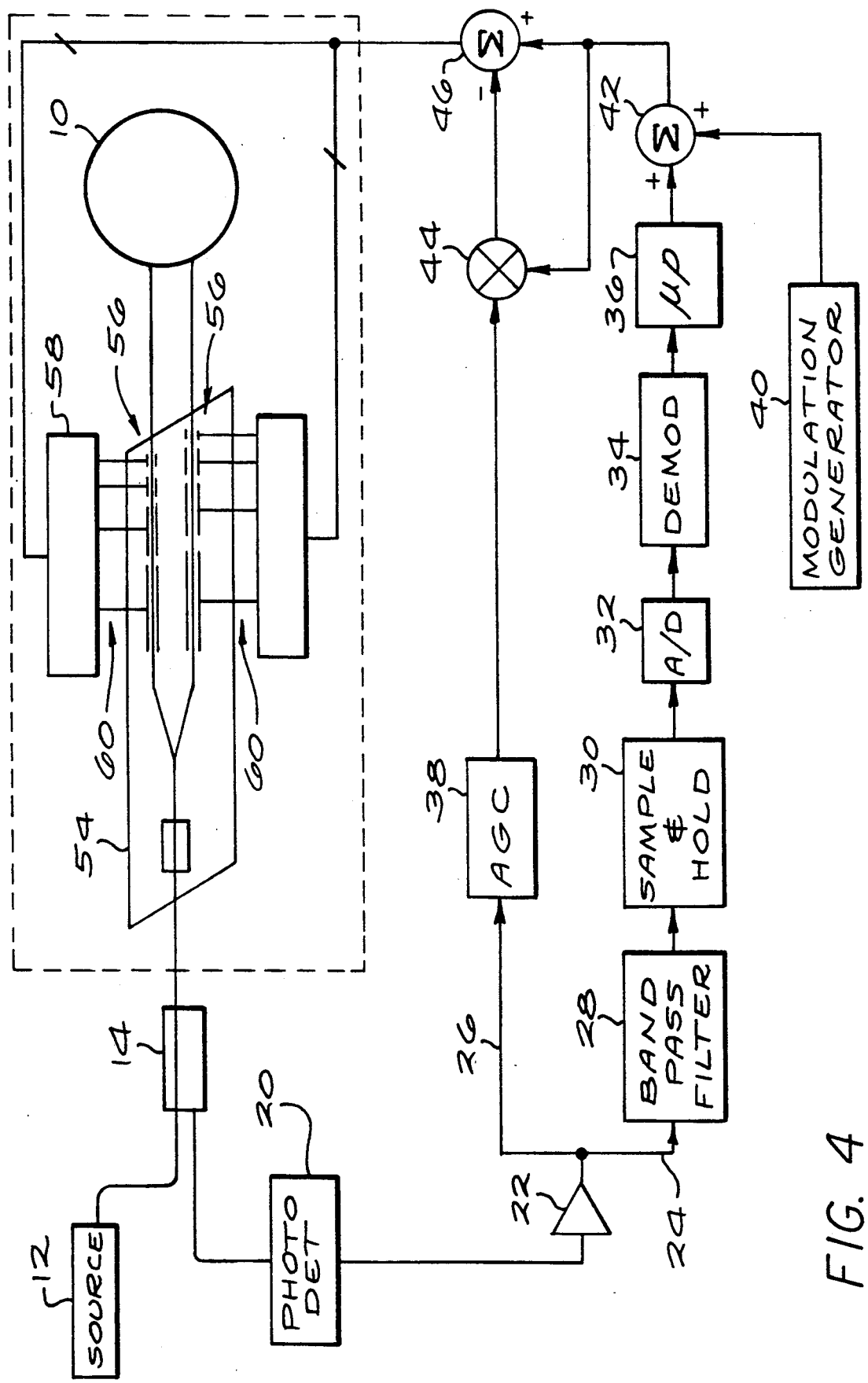
FIG. 4 is a schematic diagram of a closed loop fiber optic gyro that includes a phase modulator in accordance with the present invention.
Figure 5:
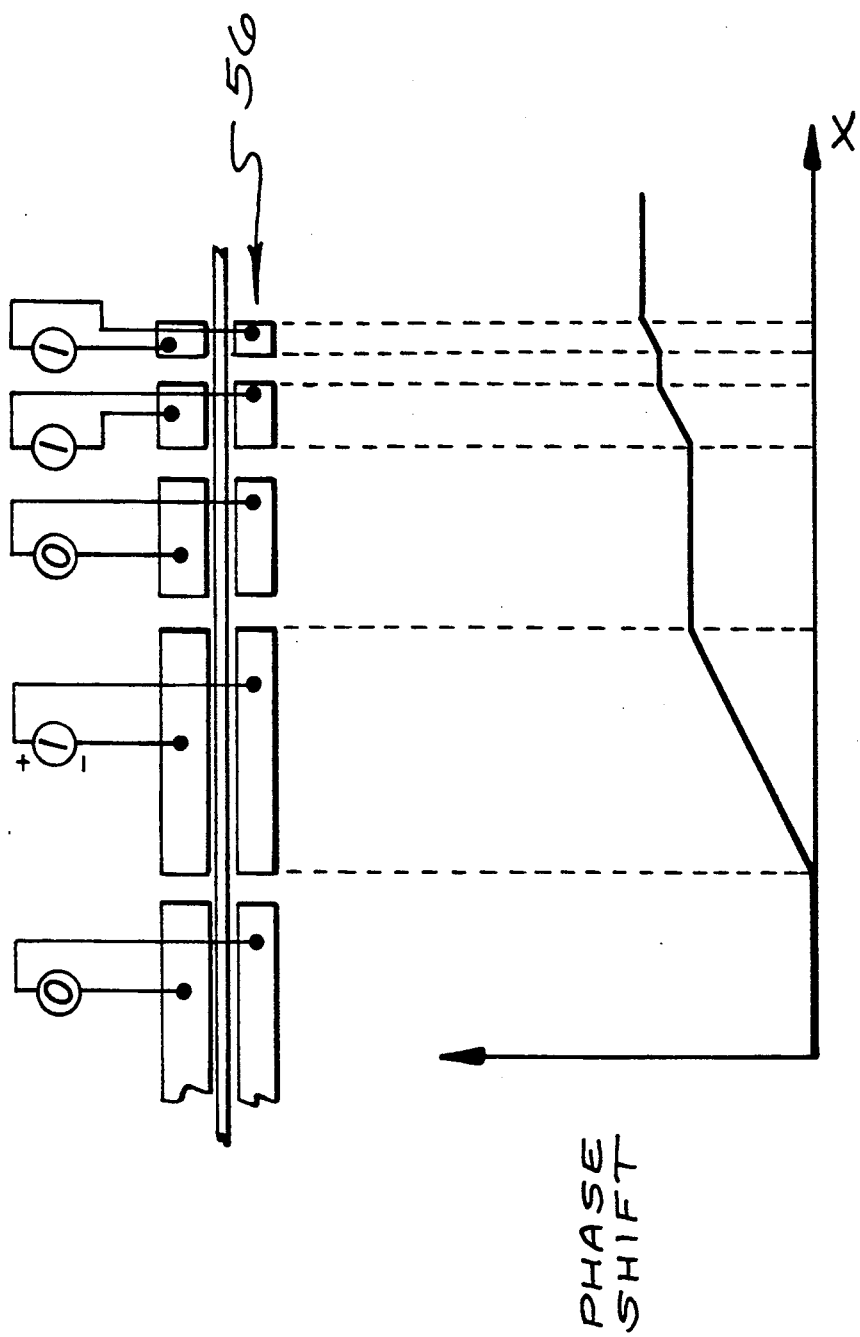
FIG. 5 is graph for illustrating the process whereby a predetermined non-reciprocal phase difference is affected by means of a digital phase modulator in accordance with the invention.

In contrast, FIG. 4 is a schematic diagram of a closed loop fiber optic gyro that includes a phase modulator in accordance with the present invention. The phase modulator 54 functions within a system generally in accordance with FIG. 3. Elements generally common to the prior art system are indicated in FIG. 4 by the same numeral as in FIG. 3. However, unlike the prior art system that employs an analog phase modulator 16 and thereby requires an expensive digital-to-analog converter and an analog driver, a novel digital phase modulator 54 is employed in the invention. In contrast to the analog-controlled modulator 16, the electrodes of the modulator 54 comprise a segmented array of electrode elements 56. Each electrode element differs in effective length from both the next shorter element and the next longer element by a factor of two. That is, the set of electrode elements forms a binary sequence. As a result, a corresponding binary sequence of voltages can be applied by such elements to the fiber optic coil 10. Furthermore, since the phase shifts experienced by a beam in passing through the "gauntlet" of electrode elements are additive, a desired shift can be impressed by actuation of preselected ones of the elements. The additive process whereby one of the counterpropagating beams is incrementally shifted in phase as it passes through the portion of optical coil 20 adjacent the electrode elements 16 is illustrated in FIG. 5.

Figure 6:
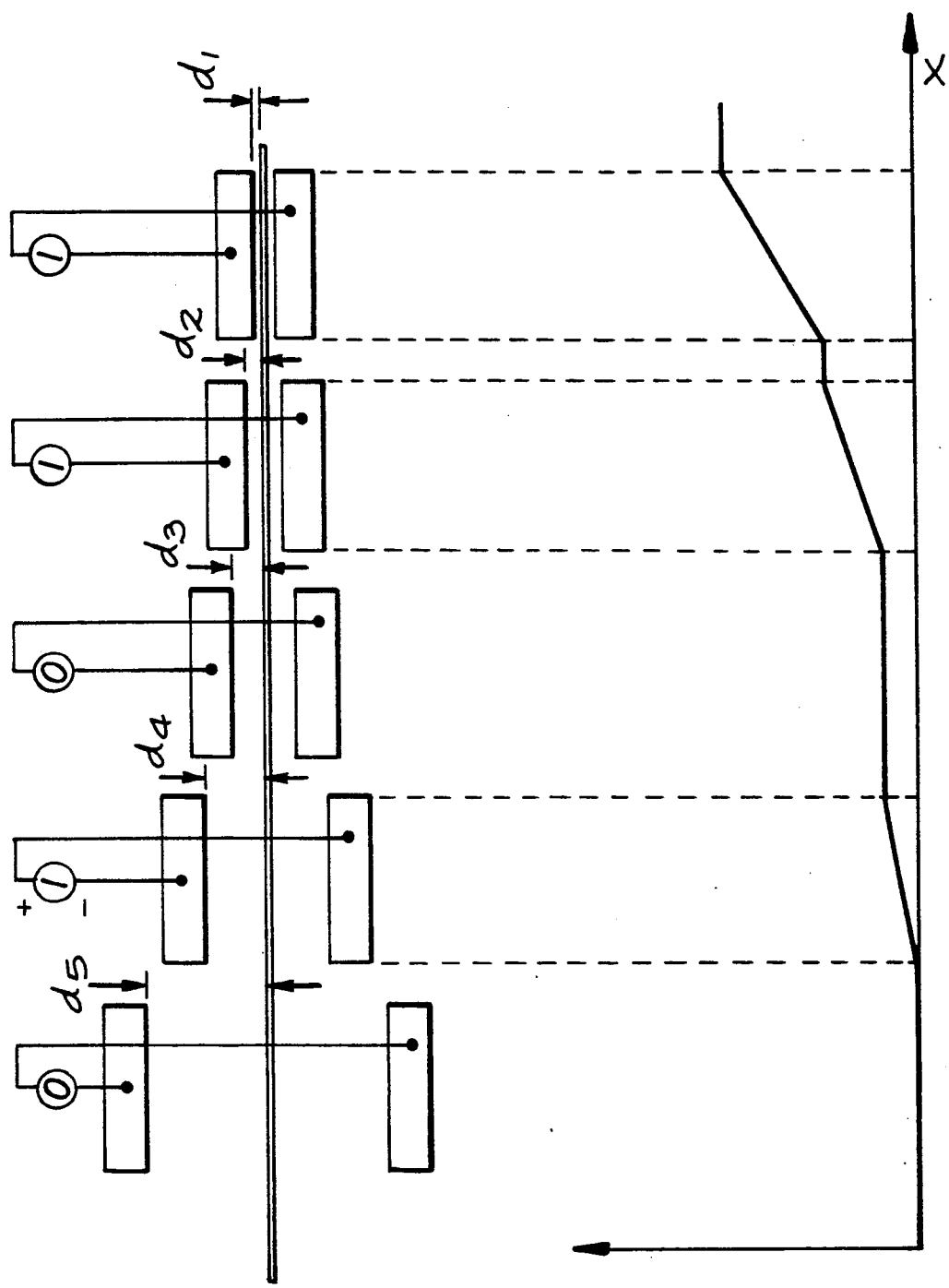
FIG. 6 is a schematic diagram of an alternative embodiment of the phase modulator of the invention.

The amount of phase shift experienced is proportional to effective electrode element length so that a correspondence exists between the binary number corresponding to the actuated electrode elements and the resulting amount of phase shift. The term "effective length" (of an electrode element) refers to the magnitude of the phase shift that is induced in the light beam as it passes through a portion of the coil 10 adjacent an electrode element. Since phase shift is a function of the strength of the electromagnetic field voltage imposed upon the optical coil 10 segment, the effective length of an electrode element is a function of (1) length, (2) spacing from the coil 10 and (3) voltage applied to the electrode element. Accordingly, a digital phase modulator needn't be comprised of electrodes of differing lengths. Alternatively, such a device might comprise an array of electrode elements of uniform length that are successively spaced from the coil 10 by distances "$d_i$" having a power-of-two relationship as shown in FIG. 6.

Returning to FIG. 4, a two part register 58 receives the digital word from the rollover logic 48. In the invention, the analog driver 52 and the digital-to-analog converter 50 are replaced by a substantially less expensive device, register 58, which receives the word and acts as a clocked storage buffer. The register 58 is a convention digital arrangement that receives the digital word as a series of bits, each location in the register representing a power-of-two difference from the adjacent location. Accordingly, a one-to-one correspondence is readily established between the stages of the register 58 and the segments of the electrodes through parallel connections between register stages and the electrode elements. Conductors 60 provide the requisite interconnections.

Thus, as has been shown, the present invention provides an improved phase modulator for use in a fiber optic Sagnac interferometer of the type that employs a closed-loop control system which relies upon a digital Serrodyne phase ramp. By utilizing the teachings of this invention, one may eliminate the costly digital-to-analog converter and analog driver of prior art systems. Furthermore, in employing such a phase modulator, the applied voltage at the phase modulator is much less coherent with the phase shift in the light signal in the preamplifier and the photodetector. This is to be contrasted with the prior art systems that employ analog phase modulators. In such systems, the phase modulator signal is coherent with the preamplifier signal, mandating very careful shielding. The reduction in coherence results in a corresponding reduction in shielding requirements.

While this invention has been described with reference to its presently preferred embodiment, it is not limited thereto. Rather, the present invention is limited only insofar as defined by the following set of claims and includes within its scope all equivalents thereof.

What is claimed is:

1. A circuit for measuring the output of a fiber optic gyroscope comprising, in combination:
   a) an optical fiber;
   b) a photodetector for receiving the optical output of said gyroscope and converting said optical output to a corresponding electrical signal;
   c) means for generating a digital Serrodyne phase ramp;
   d) means for generating a digital phase modulation signal;
   e) means for combining said digital signals to form a digital word; and
   f) a digital phase modulator responsive to said phase ramp and said phase modulation signals, said phase modulator including a plurality of electrode elements, each of said elements being arranged to receive a predetermined bit of said digital word and capable of causing a predetermined incremental phase shift in response thereto.

2. A circuit as defined claim 1 wherein said phase modulator additionally includes:
   a) at least one electrode, said electrode comprising a plurality of said electrode elements spaced along a predetermined portion of said optical fiber; and
   b) the effective lengths of said electrodes bear a power-of-two relationship.

3. A circuit as defined in claim 2 further including a register for receiving said word and for applying said word to said electrodes.

4. A circuit as defined in claim 3 wherein said electrode elements are aligned parallel to said predetermined portion of said optical fiber.

5. A circuit as defined in claim 4 wherein said electrode elements are uniformly spaced from said optical fiber.

6. A circuit as defined in claim 5 wherein adjacent electrode elements vary in length by a factor of two.

7. A circuit as defined in claim 1 wherein said phase modulator is further characterized in that:
   a) said electrode elements are of uniform lengths; and
   b) the spacings of adjacent electrode elements from said predetermined portion of said optical fiber vary by a factor of two.

* * * * *